United States Patent
Morgan et al.

(10) Patent No.: US 11,201,875 B2
(45) Date of Patent: Dec. 14, 2021

(54) WEB THREAT INVESTIGATION USING ADVANCED WEB CRAWLING

(71) Applicant: Webroot Inc., Broomfield, CO (US)

(72) Inventors: John Morgan, San Diego, CA (US);
Rob Tietje, San Diego, CA (US);
David Wang, San Diego, CA (US);
Tejas Pattabhi, San Diego, CA (US);
Josh Biol, San Diego, CA (US)

(73) Assignee: Webroot, Inc., Broomfield, CO (US)

( * ) Notice: Subject to any disclaimer, the term of this patent is extended or adjusted under 35 U.S.C. 154(b) by 503 days.

(21) Appl. No.: 16/021,630

(22) Filed: Jun. 28, 2018

(65) Prior Publication Data
US 2020/0007559 A1    Jan. 2, 2020

(51) Int. Cl.
*G06F 21/56* (2013.01)
*G06F 17/00* (2019.01)
*H04L 29/06* (2006.01)
*G06F 16/951* (2019.01)

(52) U.S. Cl.
CPC ........ *H04L 63/1416* (2013.01); *G06F 16/951* (2019.01); *H04L 63/1425* (2013.01)

(58) Field of Classification Search
CPC ............. H04L 63/1416; H04L 63/1425; H04L 63/1483; G06F 16/951; G06F 16/955
See application file for complete search history.

(56) References Cited

U.S. PATENT DOCUMENTS

2008/0010368 A1* 1/2008 Hubbard ............... G06F 16/285
  709/223
2008/0010683 A1* 1/2008 Baddour ............... G06F 16/951
  726/24
2015/0200962 A1* 7/2015 Xu ........................ G06F 21/566
  726/23
2016/0191548 A1* 6/2016 Smith ................... G06F 21/565
  726/23
2017/0359368 A1* 12/2017 Hodgman ........... H04L 63/1441

FOREIGN PATENT DOCUMENTS

EP          1672515 A1 *  6/2006  ........... G06F 21/566

OTHER PUBLICATIONS

Shiju Li; Chul-Ho Lee; Do Young Eun; "Trapping Malicious Crawlers in Social Networks"; CIKM '20: Proceedings of the 29th ACM International Conference on Information & Knowledge Management; Oct. 2020; Oct. 2020; pp. 775-784 (Year: 2020).*

* cited by examiner

*Primary Examiner* — Kendall Dolly
*Assistant Examiner* — Courtney D Fields
(74) *Attorney, Agent, or Firm* — Sprinkle IP Law Group

(57) ABSTRACT

Examples of the present disclosure describe systems and methods for evaluating malicious web content for associated threats using specialized web crawling techniques. In aspects, a first set of malicious and/or potentially malicious resource identifiers is identified. The first set of resource identifiers is evaluated to determine at least a second set of resource identifiers associated with the first set of resource identifiers. The second set of resource identifiers are provide to a web crawling component, which scans the second set of resource identifiers using a threat detection component. If any resource identifiers in the second set of resource identifiers are identified as malicious (or potentially malicious), those resource identifiers may be classified and recorded, provided to the web crawling component, and/or added to the first set of resource identifiers in subsequent threat detection analyses.

19 Claims, 4 Drawing Sheets

WEB THREAT INVESTIGATION USING ADVANCED WEB CRAWLING

BACKGROUND

Cyberattacks are deliberate exploitations of computer systems, infrastructures and networks. Cyberattacks encompass a broad range of web threats including hidden threats and zero day threats. Although various approaches to cybersecurity have developed, many web threats remain undetectable. For example, while conventional cybersecurity techniques may identity particular web content as malicious (or potentially malicious), such techniques are generally ineffective to detect immediate (or latent) threats associated with the particular malicious web content.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for evaluating malicious web content for associated threats using specialized web crawling techniques. In aspects, a first set of malicious and/or potentially malicious resource identifiers is identified. The first set of resource identifiers is evaluated to determine at least a second set of resource identifiers associated with the first set of resource identifiers. The second set of resource identifiers are provided to a web crawling component, which scans the second set of resource identifiers using a threat detection component. If any resource identifiers in the second set of resource identifiers are identified as malicious (or potentially malicious), those resource identifiers may be classified and recorded, provided to the web crawling component, and/or added to the first set of resource identifiers in subsequent threat detection analyses.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
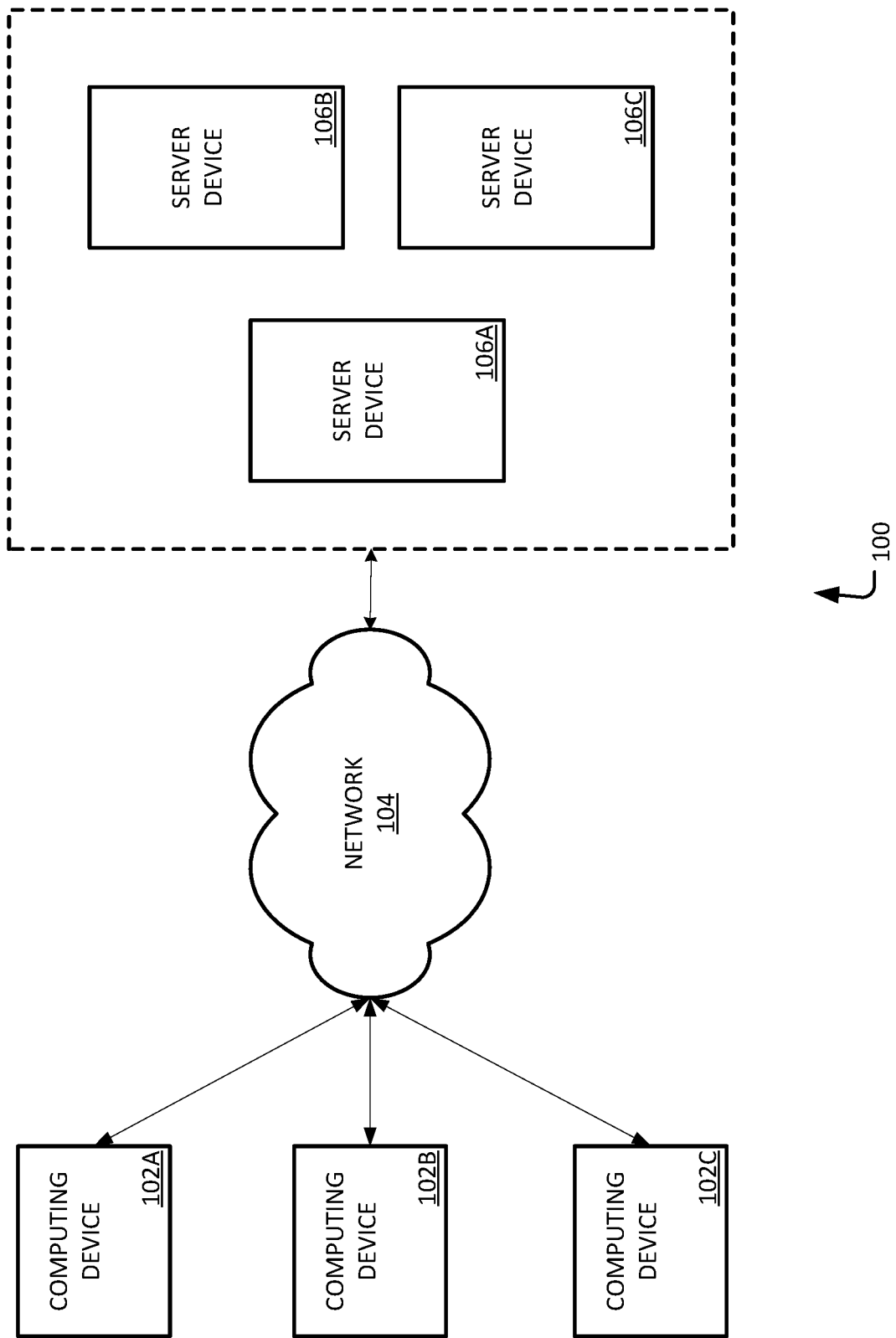
FIG. 1 illustrates an overview of an example system for evaluating malicious web content for associated threats, as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Various approaches to combatting web threats have been developed over the years. Many of these approaches include the evaluation of particular targeted web resource, such as a webpage or a link. Based on the evaluation, the identified threat of the targeted web resource may be neutralized or mitigated. In many instances, however, the identified threat is simply one of many threats associated with the web resource. For example, a malicious webpage may be associated with a website comprising several malicious webpages or additional malicious content. The conventional web threat detection approaches described above are not operable to extend the evaluation of a single identified web resource threat to encompass web resources associated with the single identified web resource threat.

To address such limitations of conventional web threat detection approaches, the present disclosure describes systems and methods for using specialized web crawling techniques to thoroughly investigate malicious web resources for associated web threats. In aspects, a first set of malicious and/or potentially malicious resource identifiers (e.g., URLs, URNs, etc.) is identified and/or collected from one or more detection sources. Example detection sources may include users, data stores of known and/or suspected web resources, external web/data crawling utilities, and the like. Each of resource identifiers in the first set of resource identifiers may be evaluated to determine web resources (e.g., webpages, hyperlinks, electronic messages, data from services and databases, files, etc.) associated with that resource identifier. The associated web resources for each resource identifier may be placed or organized into a second set of resource identifiers. The second set of resource identifiers (or a subset thereof) may be provided to a web crawling component, which may facilitate the scanning of the second set of resource identifiers by a threat detection component. Scanning the second set of resource identifiers may comprise, for example, investigating the root and sub-domains of a web resource, the links of a web resource, the IP address hosting a web resource, other web resources hosted on the hosting IP address, the geolocation of one or more IP addresses, and/or other domains owned by the owner of a web resource.

The threat detection component may classify the resource identifiers in the second set of resource identifiers into one or more groups or categories (e.g., malicious, suspicious, safe, unknown, etc.). If any resource identifiers in the second set of resource identifiers are identified as exceeding a particular safety or trustworthiness level (e.g., malicious or suspicious), those resource identifiers may be recorded and stored in a data store, provided to the web crawling component, added to the first set of resource identifiers in subsequent threat detection analyses, and/or provided to one or more users. In at least one aspect, one or more corrective or informative actions may be offered or performed when one or more resource identifiers are identified as exceeding the safety or trustworthiness level.

Accordingly, the present disclosure provides a plurality of technical benefits including but not limited to: increasing computing environment security, performing an iterative web threat analysis based on a single web resource, generating and storing lists of malicious and/or potentially malicious web resources, implementing the functionality of web crawler utility and/or a threat detector utility, reducing the computational resources and time needed to investigate web threats using targeted threat analysis, among other examples.

FIG. 1 illustrates an overview of an example system for evaluating malicious web content for associated threats, as described herein. Example system 100 presented is a combination of interdependent components that interact to form an integrated whole for monitoring the security privileges of a process. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the example operating environments depicted in FIG. 4. In other examples, the components of systems disclosed herein may be spread across multiple devices. For instance, input may be entered or detected on a client device and information may be processed or accessed from other devices in a network, such as one or more server devices.

As one example, the system 100 comprises client devices 102A-C, distributed network 104, and a distributed server environment comprising server devices 106A-C. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

Computing devices 102A-C may be configured to provide access to one or more malicious or suspicious (e.g., potentially malicious) resources and/or corresponding resource identifiers. Examples of computing devices 102A-C may include client devices (e.g., a user's laptop or PC, mobile device, wearable device, etc.), web-based appliances, resource identification utilities/systems (such as a web crawler, search bot, or spidering utility), or the like. In aspects, computing devices 102A-C may comprise a set of local resources identifiers and/or a set of remote resources may be accessible to computing devices 102A-C. The set of resource identifiers may comprise resource identifiers of various types, such as malicious, suspicious, safe, etc. Alternately, the set of resource identifiers may comprise only resource identifiers of a particular type (e.g., malicious). Accessing the set of remote resources may include submitting one or more queries to a search utility/service, accessing a data store of malicious resource identifiers, executing a web crawler utility/service, or the like. After identifying a set of resource identifiers, computing devices 102A-C may provide the set of resource identifiers to a web crawling utility/service using network 104.

Server devices 106A-C may be configured to facilitate the evaluation of a set of resource identifiers. Examples of server devices 106A-C may include resource identifier discovery devices, web crawler devices, threat detection and classification devices, data storage devices, remedial action devices, and the like. In aspects, server devices 106A-C may be provided access to a set of resource identifiers. The set of resource identifiers may be evaluated using one or more of server devices 106A-C, or components thereof. For example, the set of resource identifiers may be provided to a resource identifier discovery utility (or device). The resource identifier discovery utility may be implemented on one or more of server devices 106A-C, or may be located remotely to server devices 106A-C. The resource identifier discovery utility may identify content related to the set of resource identifiers by investigating, for example, investigating the root and sub-domains of the resource identifiers (and corresponding resources), the internal and external links associated with the resource identifiers, the IP addresses hosting the resource identifiers (and/or corresponding resources), other resource identifiers (and/or corresponding resources) hosted by the hosting IP address, the geolocation of one or more IP addresses, and/or other domains owned by the owner of the resource identifiers. The resource identifier discovery utility may provide the content related to the set of resource identifiers to a web crawling utility. The web crawling utility may search and evaluate the related content to generate a list of content associated with each resource identifier in the related content. The web crawler utility may provide the list of content to a threat detection and/or classification utility.

The threat detection/classification utility may be implemented on one or more of server devices 106A-C, or may be located remotely to server devices 106A-C. The threat detection/classification utility may evaluate the content related to the set of resource identifiers. Evaluating the content may include using one or more rule sets, models or algorithms to classify the resource identifiers in the content into one or more groups or categories (e.g., malicious, suspicious, safe, unknown, etc.). A model, as used herein, may refer to a predictive or statistical machine learning component that may be used to determine a probability distribution over one or more character sequences, classes, objects, result sets or events, and/or to predict a response value from one or more predictors. A model may be a rule-based model, a machine learning regressor or classifier, a neural network, or the like. The threat detection/classification utility (or a separate component of server devices 106A-C) may evaluate the classifications of the resource identifiers to determine whether one or more of the classifications meets or exceeds a particular safety or trustworthiness level. If it is determined that one or more of the classifications meets or exceeds the safety/trustworthiness level, the corresponding resource identifiers may be recorded and stored in a data store, provided to a web crawling component (such as web crawler utility described above), presented to one or more users, provided to a remedial action device, or the like.

In some aspects, a remedial action device may be implemented on one or more of server devices 106A-C, or may be located remotely to server devices 106A-C. The remedial action device may evaluate one or more groups of resource identifiers classified by the threat detection/classification utility. Based on the evaluation, one or more corrective or informative actions may be offered or performed. Examples of remedial actions may include generating and displaying warnings and/or notifications, terminating one or more processes, modifying a set of permissions or privilege levels, quarantining one or more files, initiating (locally or remotely) anti-exploit software/services, etc.

Figure 2:
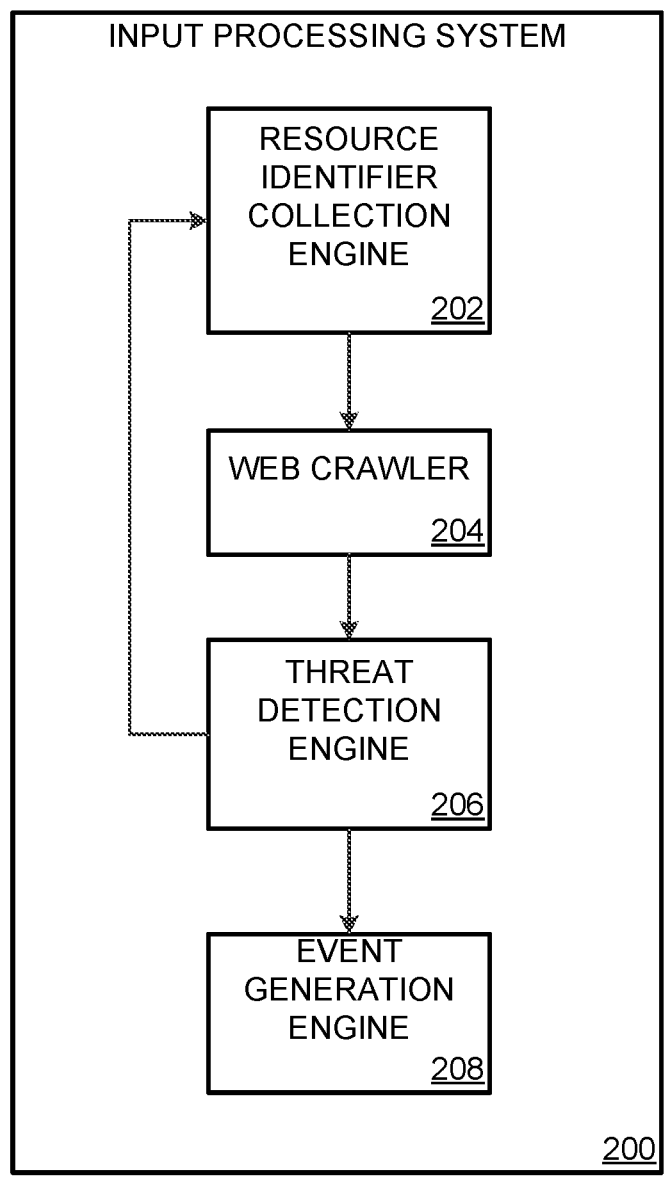
FIG. 2 illustrates an example input processing system for evaluating malicious web content for associated threats as described herein.

FIG. 2 illustrates an overview of an exemplary input system 200 for evaluating malicious web content for associated threats, as described herein. The exploit prevention techniques implemented by input processing system 200 may comprise the techniques and content described in FIG. 1. In alternative examples, a distributed system (comprising one or more components such as processor and/or memory) may perform the techniques described in system 200.

With respect to FIG. 2, input processing system 200 may comprise resource identifier collection engine 202, web crawler 204, threat detection engine 206, and event generation engine 208. Resource identifier collection engine 202 may be configured to access resource identifiers corresponding to malicious or suspicious web resources. In aspects, resource identifier collection engine 202 may receive or collect one or more resource identifiers from one or more internal and/or external sources. The resource identifier(s) may represent previously-identified web threats, recently detected web threats, and/or potential web threats. Resource identifier collection engine 202 may investigate the resource identifier(s) to identify content (e.g., resource identifiers and corresponding resources) related to the resource identifier(s). In examples, identifying the related content may comprise using one or more investigation utilities or services to investigate the root and sub-domains of the resource identifiers (and corresponding resources), the internal and external links associated with the resource identifiers, the IP addresses hosting the resource identifiers (and/or corresponding resources), other resource identifiers (and/or corresponding resources) hosted by the hosting IP address, the geolocation of one or more IP addresses associated with the resource identifiers, and/or other domains owned by the owner of the resource. In aspects, the resource identifier(s) for the related content may be made accessible to a web content search utility, such as web crawler 204.

Web crawler 204 may be configured to search and evaluate resources associated with one or more resource identifiers. In aspects, web crawler 204 may have access to one or more resource identifiers. Web crawler 204 may scan the resource identifiers (and/or the corresponding resources) to determine resources made available via the resource identifiers. The determined resources may be added to a list or queue representing resources/resource identifiers to be scanned by web crawler 204. In examples, scanning the resource identifiers may include applying a threat detection and evaluation utility or service, such as threat detection engine 206, to the resource identifiers. Threat detection engine 206 may be configured to provide multi-vector protection and threat intelligence services for endpoints and networks by detecting, monitoring, preventing, and/or mitigating malware attacks and suspected threats. Threat detection engine 206 may be used to determine whether a resource or resource identifier is malicious or comprises malicious (or suspicious) content. The determination may include the use of one or more rule sets, models, or algorithms. The determination may additionally or alternately include identifying and applying a classification to a resource identifier. In examples, the classification may indicate a trust or threat rating for a resource identifier. In aspects, when a resource identifier is determined to be malicious (or suspicious), threat detection engine 206 may, for example, record the resource identifier and associated classification information in an accessible data store, and/or provide the resource identifier to resource identifier collection engine 202. In at least one aspect, threat detection engine 206 may additionally communicate information and/or instructions relating to the resource identifiers and/or corresponding classifications to an action performing utility or service, such as event generation engine 208.

Event generation engine 208 may be configured to offer or perform one or more corrective or informative actions. In aspects, event generation engine 208 may receive information and/or instructions relating to one or more resource identifiers. Event generation engine 208 may evaluate the information and/or instructions using a rule set or other evaluation criteria to select one or more actions to perform. Example actions may include generating and displaying warnings and/or notifications, terminating one or more processes, generating a report, blocking access to resource identifiers, notifying a threat monitoring authority of identified threats, implementing targeted threat security on end user devices, updating a list or database of known or suspected threats, modifying a set of permissions or privilege levels, quarantining one or more files, initiating (locally or remotely) anti-exploit software/services, etc.

Figure 3:
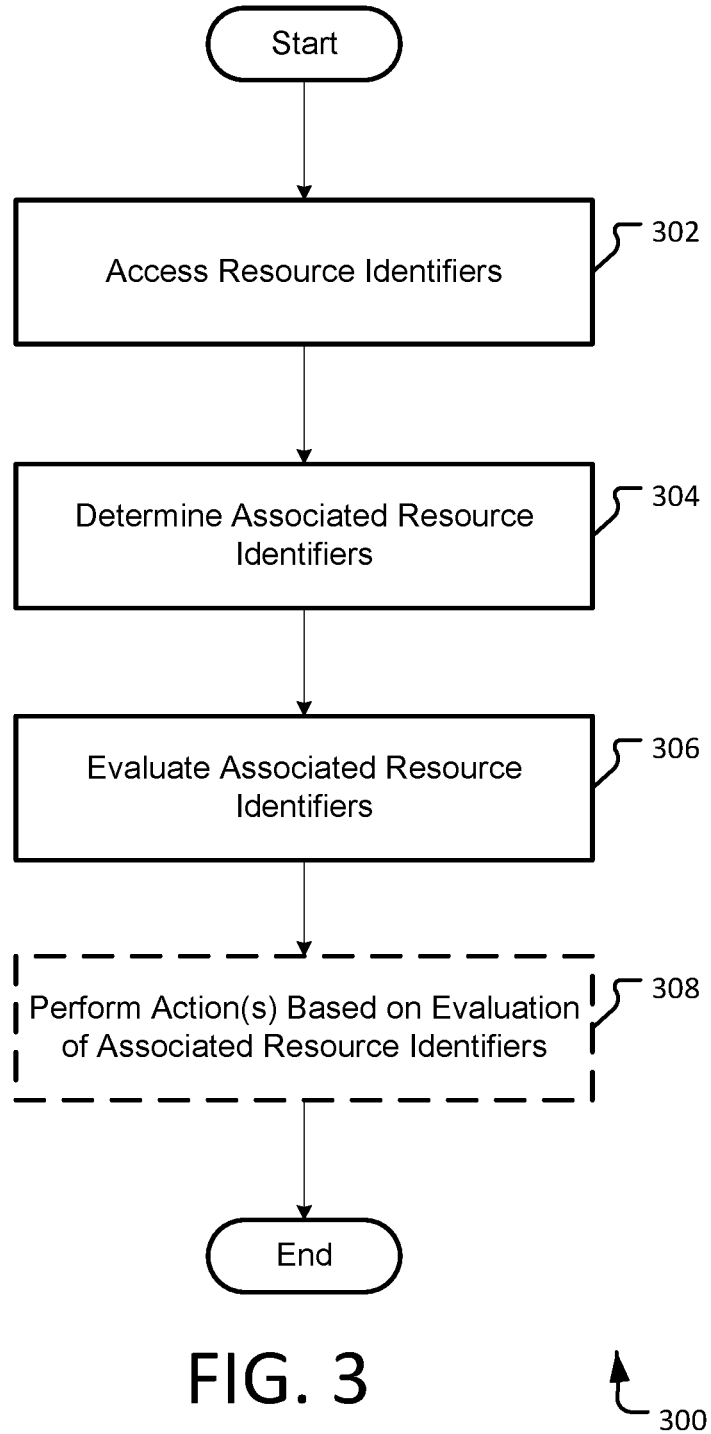
FIG. 3 illustrates an example method for evaluating malicious web content for associated threats as described herein.

FIG. 3 illustrate example methods for evaluating malicious web content for associated threats, as described herein. In aspects, method 300 may be executed by an exemplary system such as system 100 of FIG. 1 and system 200 of FIG. 2. In examples, method 300 may be executed on a device comprising at least one processor configured to store and execute operations, programs or instructions. However, method 300 is not limited to such examples. In other examples, method 300 may be performed by a remote application or service. In yet other examples, method 300 may be executed (e.g., computer-implemented operations) by one or more components of a distributed network, such as a web service or distributed network service (e.g. cloud service).

Example 300 begins at operation 302 where one or more resource identifiers may be accessed. In aspects, a data analysis system may have access to one or more internal and/or external data sources comprising resource identifiers. For example, the data analysis system may be operable to receive resource identifiers from one or more users via an API or graphical user interface (GUI), an external web crawler service, and/or an internal data store of previously-identified, malicious resource identifiers. The accessed resource identifiers may aggregated and/or arranged into a list of "seed" resource identifiers by a collection mechanism, such as resource identifier collection engine 202.

At operation 304, the seed resource identifiers may be investigated to determine resource identifiers associated with the seed resource identifiers. In aspects, the seed resource identifiers may be evaluated using or more investigation utilities or services. The evaluation may comprise determining the root and sub-domains of the resource identifiers (and corresponding resources), the internal and external links associated with the resource identifiers, the IP addresses hosting the resource identifiers (and/or corresponding resources), other resource identifiers (and/or corresponding resources) hosted by the hosting IP address, the geolocation of one or more IP addresses associated with the resource identifiers, and/or other domains owned by the resource owner. The evaluation may additionally comprise determining domain registration information (e.g., registrar name, registration time, registered user, etc.) for the resource identifiers, identifying common execution paths for web threats, and comparing web threat execution paths for various IP addresses. In aspects, the resource identifiers associated with the seed resource identifiers may be added to one or more data stores or queues, and statuses for those resource identifiers may be generated or updated.

At operation 306, the resource identifiers associated with the seed resource identifiers ("related resource identifiers") may be evaluated. In aspects, the related resource identifiers may be made accessible to a content searching utility or service, such as web crawler 204. The content searching utility may scan the related resource identifiers (and/or the corresponding resources) to determine resources made available via the related resource identifiers. For example, a webpage corresponding to a URL may be scanned to identify hyperlinks embedded in the webpage. The resource identifiers corresponding to the resources made available via the related resource identifiers may be evaluated using a web threat detection system, such as threat detection engine 206. The web threat detection system may use one or more rule sets, models, or algorithms to determine whether a resource or resource identifier is malicious or comprises malicious (or suspicious) content. The determination may include comparing resource identifiers to one or more lists of known malicious resource identifiers, evaluating resource identifiers against a set of web threat heuristics, using a resource identifier lookup utility, etc. For instance, continuing from the above example, the hyperlinks identified in the scan of a URL may be provided to a threat detection system accessible to the data analysis system. The threat detection system may determine whether the URL is malicious, and may label the hyperlink (or otherwise indicate the hyperlink classification) accordingly.

In aspects, the evaluated resource identifiers may be classified based on the results of the evaluation. The classification may represent one or more threat groups or categories (e.g., malicious, suspicious, safe, unknown, etc.). Alternately, the classification may represent a threat score indicating the seriousness of the detected threat, or the likelihood a resource identifier is malicious. In some aspects, resource identifiers evaluated as malicious (or suspicious) may be recorded in a storage location, and/or provided to the collection mechanism. Additionally, information and/or instructions relating to one or more malicious (or suspicious) resource identifiers may be generated. In examples, the information and/or instructions may define or represent actions for combatting or mitigating malicious (or suspicious) resource identifiers. For instance, continuing from the above example, a message may be generated when the URL is determined to be malicious. The message may comprise a hyperlink referencing a security patch for securing the vulnerabilities exploitable by the malicious URL. In some aspects, metrics for the evaluated resource identifiers may be generated. The metrics may include, for example, the number of evaluated resource identifiers, the number of unique resource identifiers identified by the data analysis system, the number of unique resource identifiers identified per execution of the web threat detection system, the number of threats detected, the number of threats detected per threat category, etc.

At optional operation 308, one or more actions may be performed based on the evaluation of the related resource identifiers. In aspects, information and/or instructions relating to one or more malicious (or suspicious) resource identifiers may be provided to an event generation mechanism, such as event generation engine 208. The event generation mechanism may execute the instructions and/or use the information to cause the execution of a set of instructions. In either scenario, the instructions may result in the performance of one or more corrective or informative actions associated with the related resource identifiers. Example actions may include generating and displaying warnings and/or notifications, terminating one or more processes, generating a report, blocking access to resource identifiers, notifying a threat monitoring authority of identified threats, implementing targeted threat security on end user devices, updating a list or database of known or suspected threats, modifying a set of permissions or privilege levels, quarantining one or more files, initiating (locally or remotely) anti-exploit software/services, etc. For instance, continuing from the above example, the event generation mechanism may execute the hyperlink in the message; thereby, causing the security patch to be installed on the data analysis system.

Figure 4:
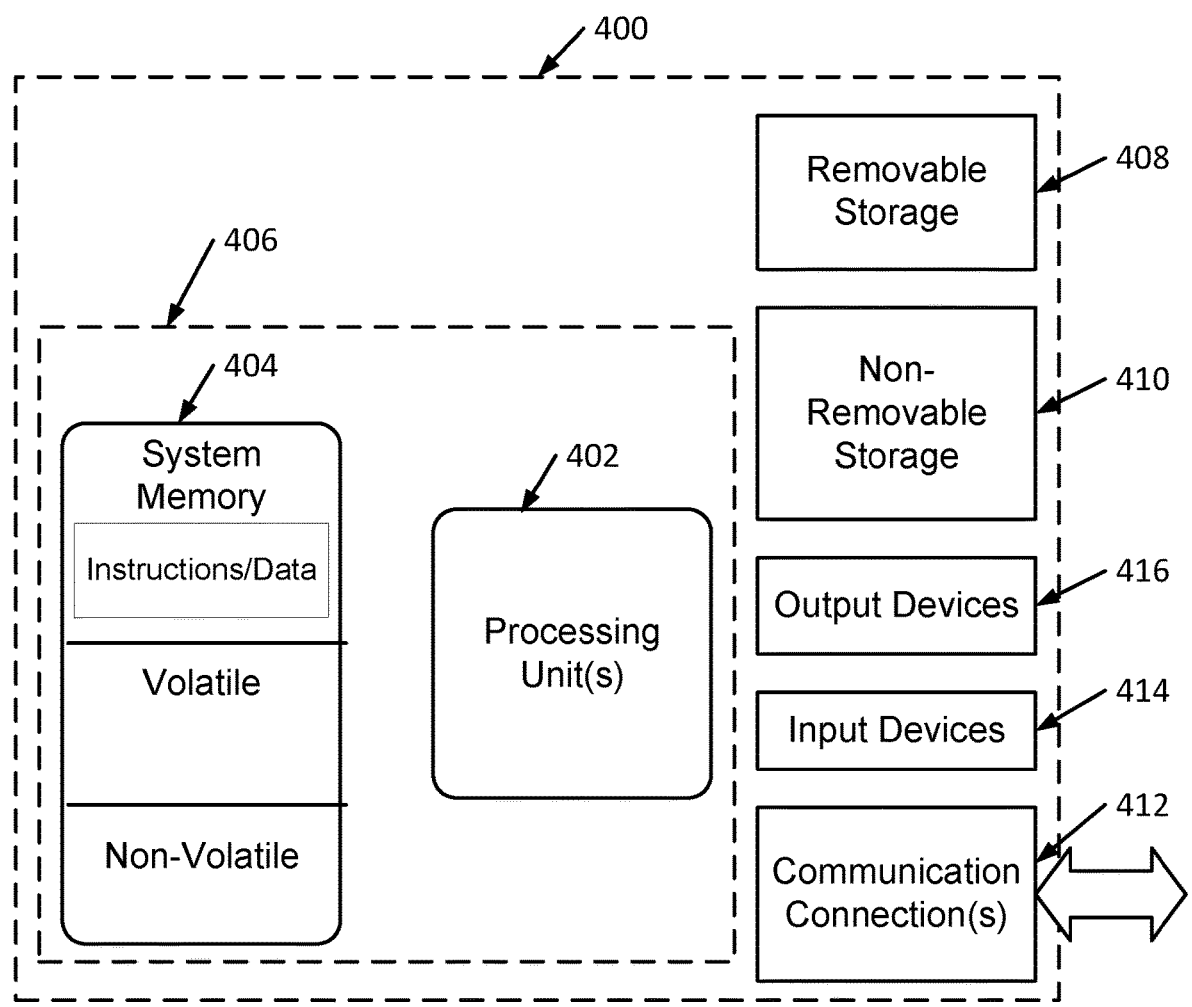
FIG. 4 illustrates one example of a suitable operating environment in which one or more of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, resource identifiers, classification data, instructions to perform the methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method comprising:
   accessing a first set of resource identifiers;
   determining a second set of resource identifiers associated with the first set of resource identifiers, wherein determining the second set of resource identifiers comprises evaluating one or more domains of the first set of resource identifiers;
   evaluating the second set of resource identifiers to determine a third set of resource identifiers identified using the second set of resource identifiers;
   evaluating the third set of resource identifiers using a machine learning model to determine whether one or more resource identifiers in the third set of resource identifiers is malicious and applying a classification from a plurality of classifications to each of the one or more resource identifiers in the third set of resource identifiers, wherein evaluating the third set of resource identifiers comprises arranging the third set of resource identifiers into one or more classifications, wherein the classifications represent one or more web threat levels; and
   based on a first classification applied to a first resource identifier from the third set of resource identifiers by the machine learning model, selecting a remedial action for the first resource identifier from a plurality of remedial actions and executing the remedial action, the plurality of remedial actions comprising:
   notifying a threat monitoring authority of the first resource identifier; and
   modifying a set of permission or privilege levels.

2. The system of claim 1, wherein the first set of resource identifiers comprises one or more resource identifiers identified as at least one of malicious and suspicious.

3. The system of claim 1, wherein determining the second set of resource identifiers comprises investigating at least one of: root domains and sub-domains of the first set of resource identifiers, internal and external links associated with the first set of resource identifiers, one or more IP addresses hosting the first set of resource identifiers, a geolocation of one or more IP addresses associated with the first set of resource identifiers, and other domains owned by a resource.

4. The system of claim 3, wherein determining the second set of resource identifiers further comprises at least one of: determining domain registration for the first set of resource identifiers, identifying common execution paths for web threats, and comparing web threat execution paths for various IP addresses associated with the first set of resource identifiers.

5. The system of claim 1, wherein evaluating the second set of resource identifiers comprises providing the second set of resource identifiers to a web crawling utility.

6. The system of claim 5, wherein the web crawling utility scans the second set of resource identifiers to identify one or more links embedded in the second set of resource identifiers.

7. The system of claim 1, wherein evaluating the third set of resource identifiers comprises applying to the third set of resource identifiers at least one of a rule set, an evaluation model, and an algorithm.

8. The system of claim 1, wherein evaluating the third set of resource identifiers further comprises generating a set of metrics identifying at least one of: a number of resource identifiers evaluated, a number of unique resource identifiers evaluated, and a number of threats detected.

9. The system of claim 1, wherein the method further comprises:
based on a determination that the first resource identifier is malicious, generating a set of instructions for performing one or more remedial actions.

10. The system of claim 1, wherein the plurality of remedial actions further comprises at least one of: displaying a warning, generating a report, blocking access to the first resource identifier, and initiating an anti-exploit utility.

11. A method comprising:
determining, by a computer system, a first set of resource identifiers;
determining, by the computer system, a second set of resource identifiers associated with the first set of resource identifiers, wherein determining the second set of resource identifiers comprises evaluating one or more domains of the first set of resource identifiers;
evaluating, by the computer system, the second set of resource identifiers to determine a third set of resource identifiers identified using the second set of resource identifiers;
evaluating, by the computer system, the third set of resource identifiers using a machine learning model to determine whether one or more resource identifiers in the third set of resource identifiers is malicious and applying a classification from a plurality of classifications to each of the one or more resource identifiers in the third set of resource identifiers, wherein evaluating the third set of resource identifiers comprises arranging the third set of resource identifiers into one or more classifications, wherein the classifications represent one or more web threat levels; and
based on a first classification applied to a first resource identifier from the third set of resource identifiers by the machine learning model, selecting a remedial action for the first resource identifier from a plurality of remedial actions and executing the remedial action, the plurality of remedial actions comprising:
notifying a threat monitoring authority of the first resource identifier; and
modifying a set of permission or privilege levels.

12. The method of claim 11, wherein the first set of resource identifiers comprises one or more resource identifiers previously identified as associated with malicious content.

13. The method of claim 11, wherein determining the second set of resource identifiers further comprises evaluating at least one of: links associated with the first set of resource identifiers, an IP addresses hosting the first set of resource identifiers, one or more IP addresses associated with the IP addresses hosting the first set of resource identifiers, and a geolocation of one or more IP addresses.

14. The method of claim 13, wherein the second set of resource identifiers is determined using an investigation utility for scanning resource identifiers.

15. The method of claim 11, wherein evaluating the second set of resource identifiers comprises providing the second set of resource identifiers to a web crawling utility.

16. The method of claim 15, wherein the web crawling utility is operable to scan the second set of resource identifiers to identify one or more links associated with the second set of resource identifiers.

17. The method of claim 11, wherein evaluating the third set of resource identifiers comprises providing the third set of resource identifiers to a threat detection utility.

18. The method of claim 17, wherein the threat detection utility is operable to determine whether one or more resource identifiers of the third set of resource identifiers is at least suspicious.

19. A non-transitory, computer-readable media storing computer executable instructions that when executed cause a computing system to perform a method comprising:
determining a first set of resource identifiers;
determining a second set of resource identifiers associated with the first set of resource identifiers, wherein determining the second set of resource identifiers comprises evaluating one or more domains of the first set of resource identifiers;
evaluating the second set of resource identifiers to determine a third set of resource identifiers identified using the second set of resource identifiers;
evaluating the third set of resource identifiers using a machine learning model to determine whether one or more resource identifiers in the third set of resource identifiers is malicious and applying a classification from a plurality of classifications to each of the one or more resource identifiers in the third set of resource identifiers, wherein evaluating the third set of resource identifiers comprises arranging the third set of resource identifiers into one or more classification, wherein the classifications represent one or more web threat levels; and
based on a first classification applied to a first resource identifier from the third set of resource identifiers, selecting a remedial action for the first resource identifier from a plurality of remedial actions and executing the remedial action, the plurality of remedial actions comprising:
notifying a threat monitoring authority of the first resource identifier; and
modifying a set of permission or privilege levels.

* * * * *